May 12, 1925.
G. C. CARHART
GEAR LAPPING MACHINE
Filed March 2, 1923
1,537,658
3 Sheets-Sheet 1
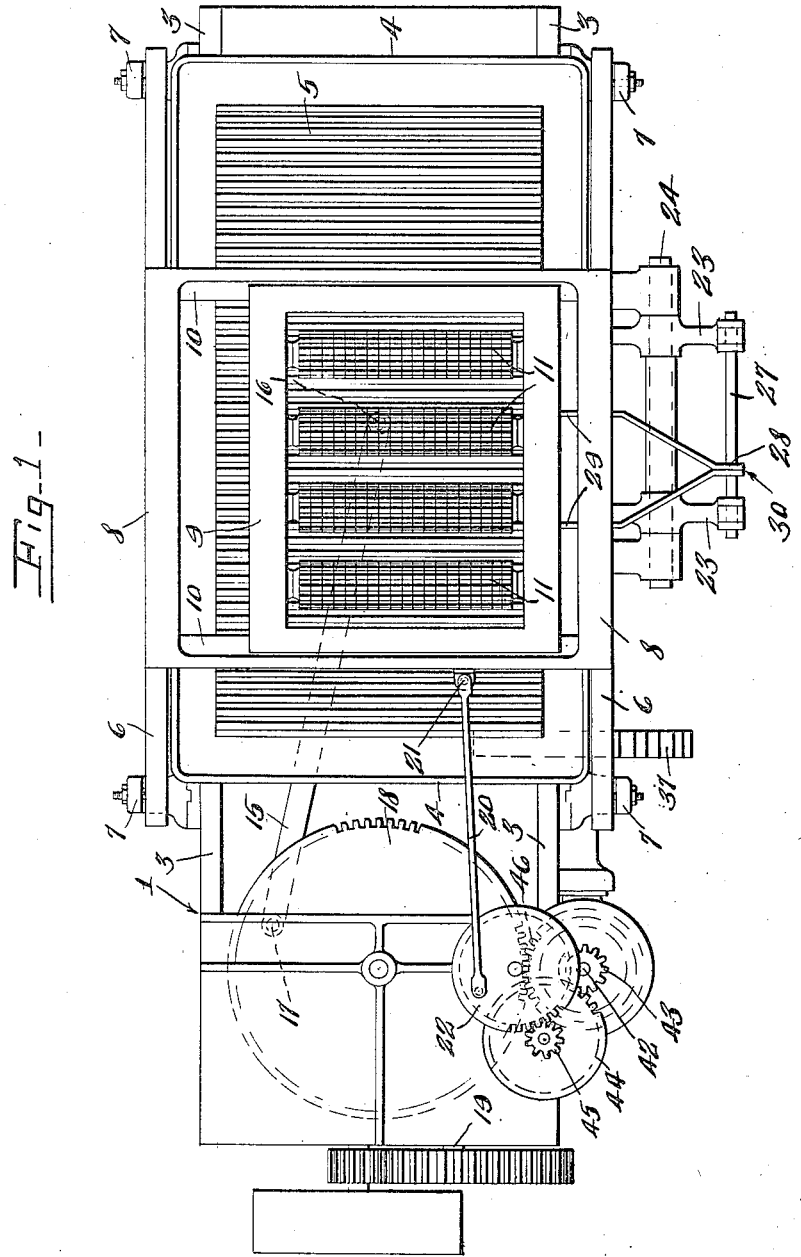
INVENTOR.
George C. Carhart
BY
ATTORNEYS.

May 12, 1925.
G. C. CARHART
GEAR LAPPING MACHINE
Filed March 2, 1923
1,537,658
3 Sheets-Sheet 2
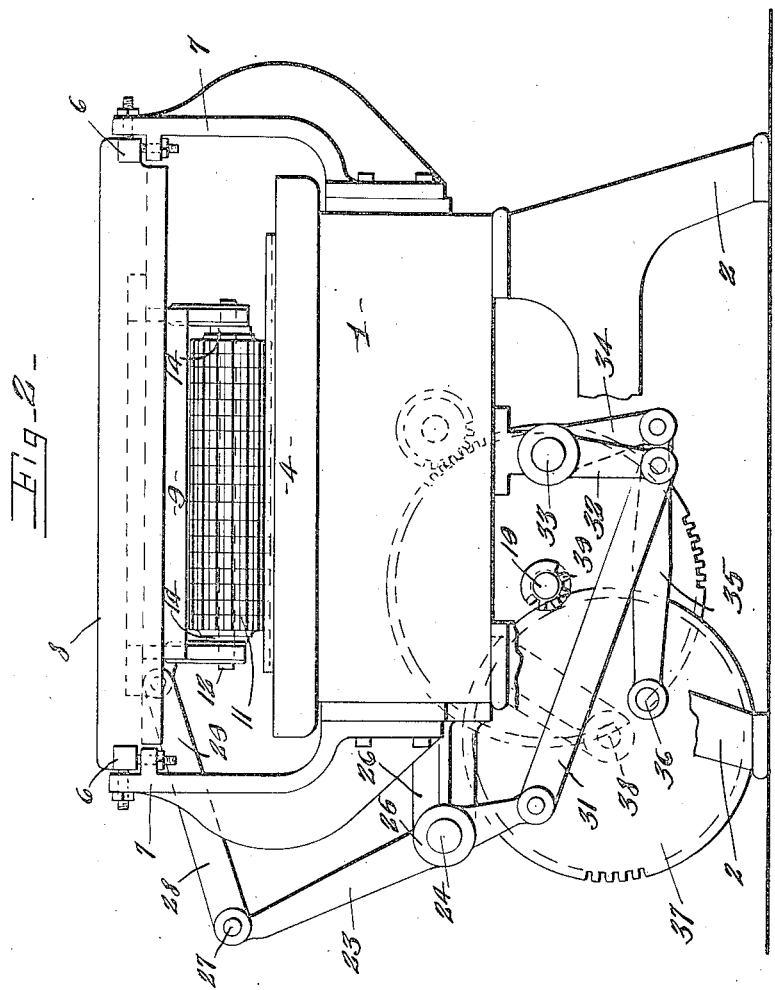
INVENTOR.
George C. Carhart.
BY
Parsons & Bodell.
ATTORNEYS.

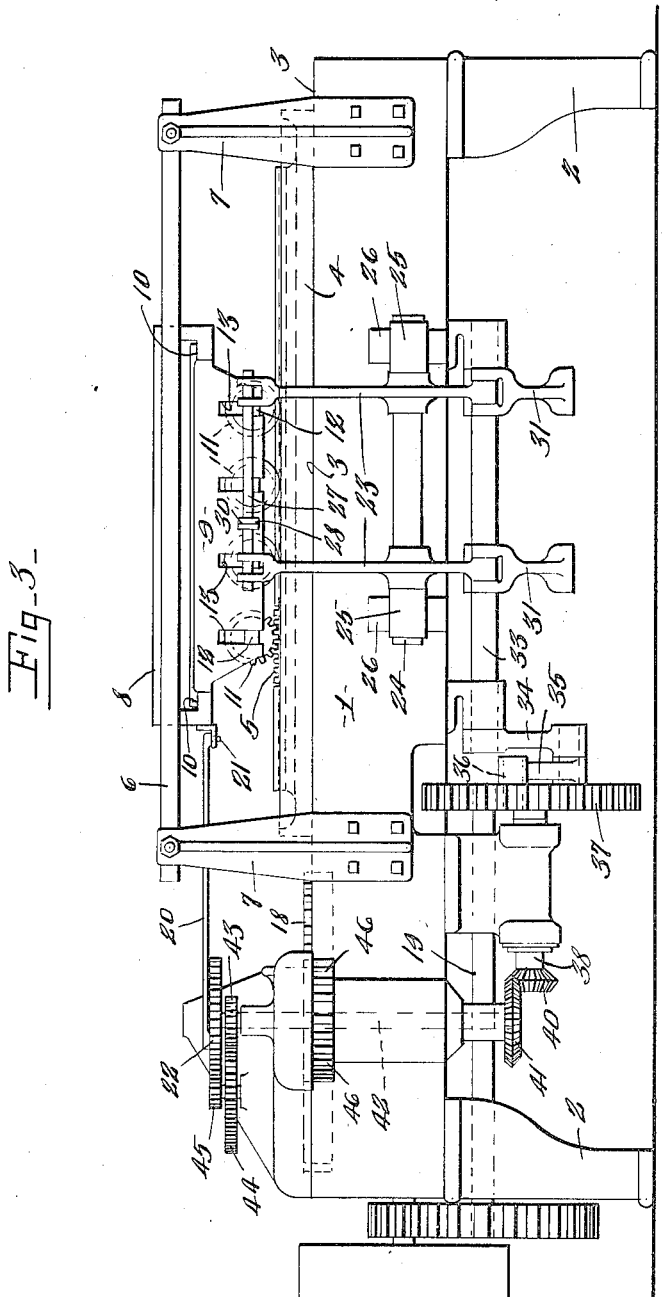

Patented May 12, 1925.

1,537,658

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

GEAR-LAPPING MACHINE.

Application filed March 2, 1923. Serial No. 622,407.

*To all whom it may concern:*

Be it known that I, GEORGE C. CARHART, a citizen of the United States, residing at Syracuse, in the county of Onondaga and State of New York, have invented a certain new and useful Gear-Lapping Machine, of which the following is a specification.

This invention has for its object a machine for lapping gears by which the gears are quickly and accurately lapped, which machine is particularly simple in construction, rapid and accurate in operation, and highly efficient and durable in use.

The invention consists in the novel features and in the combinations and constructions hereinafter set forth and claimed.

In describing this invention, reference is had to the accompanying drawings, in which like characters designate corresponding parts in all the views.

Figure 1 is a plan view of one embodiment of this gear lapping machine.

Figure 2 is an end elevation thereof.

Figure 3 is a side elevation.

This method of lapping gears comprises effecting relative sliding movement of the gear or gears and a toothed surface with which the gear is in mesh, in a direction lengthwise of the teeth of the gear or teeth of said surfaces and effecting relative movement of the gear and said surface in the direction at an angle to the sliding movement to roll the gear during such sliding movement.

The relative movement of the gear and the toothed surfaces are such that the resultant of the rolling and sliding forces is in a direction at an angle to the axis of the gear.

This gear lapping machine comprises a rack, a gear carriage arranged to hold the gear, and means for effecting relative movement of the rack and the carriage with the gear in mesh with the rack in directions lengthwise of the rack or at an angle to the axis of the gears and preferably in a direction crosswise of the rack or in the general direction of the axis of such gear such relative movement effecting the lapping of the gears whereby the resultant of the lengthwise and crosswise movements is in a direction at an inclined angle to the teeth of the rack.

It further preferably includes means for effecting relative feeding movement of the rack and gear carriage in a direction lengthwise of the rack to effect a relative rolling or change of position of the gears and rack teeth so that the same teeth of the gears and the same portions of the rack do not mesh during repeated lapping movements and undue and uneven wear of the rack teeth avoided.

In the illustrated embodiment of this invention, the rack is shown as mounted to reciprocate in a direction at an angle to the axis of the gears, and the gear carriage to reciprocate to carry the gears lengthwise and crosswise of the rack in a direction substantially parallel to the rack teeth, and also to have a feeding movement lengthwise of the rack to effect the rolling or shifting operation of the gears along the rack, during the reciprocations of the rack and the reciprocations of the gear carriage crosswise of the rack. Preferably, the reciprocation of the gear carriage is at a greater speed than the reciprocation of the rack, that is, several crosswise reciprocations of the gear carriage occur during one movement of the rack.

Also, the feeding movement of the gear carriage lengthwise of the rack to roll or shift the gears relatively to the rack is comparatively slow.

In the illustrated embodiment of this invention, 1 designates the main frame or bed supported on suitable legs 2, the bed being formed with ways or guides 3.

4 is a rack carriage reciprocably mounted on the ways 3, and carrying a relatively wide rack 5 which is usually composed of several sections or slabs. The teeth of the rack in this embodiment of my invention extend at substantially a right angle to the direction of movement of the rack.

The main frame 1 is also formed with a second set of ways 6 here shown as arranged in a plane above and substantially parallel to the ways 3 and supported on brackets 7 rising from opposite sides of the frame 1.

8 is a second carriage mounted to move along the ways 6. 9 is the third or gear carriage movable along ways 10 on the carriage 8 transversely of the rack 4, the third gear carriage supporting the gears 11 to be lapped.

The carriage 8 is here illustrated as in the form of a rectangular frame and the carriage 9 is also shown as in the form of a rectangular frame and is provided with suitable means for guiding or holding arbors 12 on which the gears 11 are mounted to project below or through the carriage 8 and mesh with the rack 4, or to guide or hold the stems or stem gears, while the mesh gears are held in mesh, as for instance, by gravity with the rack.

As here shown, the carriage 9 is formed with a plurality of slots 13 in the opposite side members thereof, these slots opening through the lower faces of the side members, and being suitably formed to receive means as bearing boxes 14 in which the arbors journalled, or to which the stems of stem gears are connected during the lapping operation. These slots are of such length as to permit vertical play of the arbors and also long enough to permit the arbor to be lifted high enough to permit the gear teeth to clear the rack so the gears can be rotated or shifted about the axis of the arbor by hand.

The reciprocations of the carriage 9 crosswise of the rack 4 are preferably at a greater rate of speed than the reciprocations of the rack 4, there being usually several crosswise reciprocations of the carriage 9 to each movement of the rack carriage 4. The feeding movement of the carriage 8 to roll the gears into a new position on the rack, or so that the path of the gears changes to traverse different portions of the rack is comparatively slow or gradual with respect to the movement of the rack and all of such movements preferably take place simultaneously, although some of such movements may be intermittent.

The movements may be effected by any suitable mechanisms. The rack carriage 4 is here illustrated as actuated by a connecting rod or pitman 15 pivoted at one end at 16 to the carriage 4 centrally thereof, and at its other end to a crank or wrist pin 17 here illustrated as on a wheel 18 connected by suitable motion transmitting mechanism or gearing to a main drive shaft 19. The carriage 8 is also shown as actuated by a connecting rod 20 pivotally connected at one end at 21 to the carriage and at its other end to a crank wrist pin on the wheel or gear 22 connected by suitable motion transmitting means to the main shaft.

The gear carriage 9 as here illustrated, is reciprocated crosswise of the rack by means of spaced apart levers 23 mounted between their ends on a shaft 24 supported in bearings 25 carried by brackets 26 projecting from one lateral side of the frame 1.

The upper ends of the levers are connected by a rod 27 along which slides a link 28 having bifurcations 29 pivoted at spaced apart points to the carriage 8, the bearing 30 of the link on the rod being slidable along the rod during the feeding movement of the carriage 8.

The levers 23 are connected at their lower ends to the main shaft through suitable power transmitting mechanism.

As here shown, this mechanism includes links 31 each connected at one link end to the lower arm of one lever 23 and at its other end to an arm 32 on a rock shaft 33 which rock shaft 33 has another arm 34 connected by a connecting rod or pitman 35 of a crank or wrist pin 36 on a wheel or gear 37 mounted on a shaft 38 and meshing with a gear 39 on the drive shaft. The shaft 38 is here shown as connected by gears 40 and 41 to a vertical shaft 42 having a gear 43 at its upper end meshing with a gear 44 on the shaft of which is mounted a pinion 45 meshing with the gear 22 which actuates the carriage 8 through the connecting rod 20. The vertical shaft 42 also has a pinion or gear 46 therein meshing with the gear 18 which drives the rack carriage 4.

The actuating mechanisms per se, for the carriages 4, 8 and 9 form no part of this invention, and any mechanism capable of effecting the relative movements of the carriages may be employed.

In operation, the gears are mounted on arbors in the carriage 9 or the stems or axles of stem gears are rotatably mounted in the carriage 9 and the machine started by shifting a belt or a clutch in any of the various well known manners.

The gears are carried back and forth crosswise of the rack 5 during reciprocations of the carriage 9 and are moved about their axes during the movements of the rack carriage 5 in a direction at an angle to the axis of the gears and are further rolled or shifted relatively to the rack by the slow feeding movement of the carriage 8. A suitable lapping or grinding compound is usually applied. If desired, at intervals, the arbors may be lifted to cause the gears to clear the rack and the gear turned or shifted about the axes of the arbors.

This machine is particularly advantageous in that the gears are quickly and accurately lapped by the various relative movements and several gears or gangs can be lapped simultaneously.

What I claim is:

1. In a gear lapping machine, the combination of a rack, a gear carriage constructed to rollably mount a gear blank and hold it in mesh with the rack, and means for effecting relative movement of the rack and carriage in directions at an angle to the axis of the blank substantially as and for the purpose described.

2. In a gear lapping machine, the combination of a rack, a gear carriage constructed to rollably mount a gear blank and hold it in mesh with the rack, and means for effecting relative movement of the rack and carriage in directions at an angle to the axis of the blank and lengthwise of the axis of the blank whereby the resultant of such movements is in a direction at an angle other than a right angle to teeth of the rack and the axis of the blank, substantially as and for the purpose specified.

3. In a gear lapping machine, the combination of a rack, a gear carriage constructed to rollably mount a gear blank and hold it in mesh with the rack, and means for effecting relative movement of the rack and carriage in directions lengthwise and crosswise of the rack, substantially as and for the purpose specified.

4. In a gear lapping machine, the combination of a rack, a gear carriage constructed to rollably mount a gear blank and hold it in mesh with the rack, and means for effecting relative movement of the rack and carriage in directions lengthwise and crosswise of the rack, the teeth of the rack being arranged at substantially a right angle to the directions of the relative lengthwise movement, substantially as and for the purpose set forth.

5. In a gear lapping machine, the combination of a rack, a gear carriage constructed to rollably mount a gear blank and hold it in mesh with the rack, and means for effecting relative movement of the rack and carriage in directions lengthwise and crosswise of the rack, the teeth of the rack being arranged at substantially a right angle to the directions of the relative lengthwise movement and substantially parallel to the relative crosswise movement, substantially as and for the purpose described.

6. In a gear lapping machine, the combination of a rack, a gear carriage constructed to rollably mount a gear blank and hold it in mesh with the rack, means for moving the rack and the gear carriage in directions at an angle to each other, substantially as and for the purpose specified.

7. In a gear lapping machine, the combination of a rack, a gear carriage constructed to rollably mount a gear blank and hold it in mesh with the rack, means for moving the rack in a direction at an angle to the axis of the blank, and means for simultaneously moving the carriage crosswise of the rack, substantially as and for the purpose set forth.

8. In a gear lapping machine, the combination of a rack, a gear carriage constructed to rollably mount a gear blank and hold it in mesh with the rack, and means for effecting relative movement of the rack and the carriage in directions at an angle to the axis of the blank and lengthwise of the axis of the gear at different rates of speed, substantially as and for the purpose described.

9. In a gear lapping machine, the combination of a rack, a gear carriage constructed to rollably mount a gear blank and hold it in mesh with the rack, and means for effecting relative movements of the rack and the carriage in a direction at an angle to the axis of the blank and lengthwise of such axis and operating to effect a plurality of such relative reciprocating movements in one direction to each relative movement in the other direction at an angle thereto, substantially as and for the purpose specified.

10. In a gear lapping machine, the combination of a rack, a gear carriage constructed to rollably mount a gear blank and hold it in mesh with the rack, and means for moving the rack in a direction at an angle to the axis of the blank, and means for moving the carriage transversely of the rack, a plurality of times during each movement of the rack, substantially as and for the purpose set forth.

11. In a gear lapping machine, the combination of a rack, a gear carriage constructed to rollably mount a gear blank and hold it in mesh with the rack, means for effecting relative movements of the rack and the carriage in a direction lengthwise of the rack, at an angle to the axis of the blank, and crosswise of the rack, and means for effecting relative feeding movement of the blank and the rack during such movements of the rack and gear carriage, substantially as and for the purpose described.

12. In a gear lapping machine, the combination of a movable rack, a gear carriage constructed to rollably mount a gear blank and hold it in mesh with the rack, means for moving the rack in a direction of the angle to the axis of the blank and lengthwise of the rack, means for feeding the carriage lengthwise of the rack during such movement of the rack, and means for reciprocating the carriage crosswise of the rack during such movements of the rack and feeding movement of the carriage, substantially as and for the purpose specified.

13. In a gear lapping machine, a frame, a carriage reciprocately carried in the frame, a rack supported by said carriage, a second carriage mounted on the frame and movable lengthwise of the rack in the direction of movement of the first carriage, a gear carriage constructed to rollably mount a gear blank and hold it in mesh with the rack, the gear carriage being supported by the second carriage and reciprocally movable on the second carriage crosswise of the rack, and means for effecting the reciprocating movement of the first carriage, means for effecting the feeding movement of the second carriage to roll the blank on the rack, and means for reciprocating the third carriage on the second carriage crosswise of the rack, substantially as and for the purpose set forth.

In testimony whereof, I have hereunto signed my name, at Syracuse, in the county of Onondaga, and State of New York, this 26th day of February, 1923.

GEORGE C. CARHART.